O. C. TRAVER

May 15, 1928. SYNCHRONIZING DEVICE Re. 16,966

2 Sheets-Sheet 1

Original Filed July 29, 1922

Inventor:
Oliver C. Traver,
by Albert S. Davis
His Attorney.

O. C. TRAVER

May 15, 1928. SYNCHRONIZING DEVICE Re. 16,966

2 Sheets-Sheet 2

Original Filed July 29, 1922

Inventor:
Oliver C. Traver,
by Albert G. Davis
His Attorney

Reissued May 15, 1928. Re. 16,966

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

SYNCHRONIZING DEVICE.

Original No. 1,563,120, dated November 24, 1925, Serial No. 578,475, filed July 29, 1922. Reissue No. 16,540, dated February 8, 1927, Serial No. 153,046, filed December 6, 1926. This application for reissue filed November 21, 1927. Serial No. 234,879.

My invention relates to improvements in synchronizing devices and has for an object to provide an improved synchronizing device for automatically controlling the operation of connecting an alternating current dynamo electric machine to an alternating current electric circuit whereby the connection can be made substantially only at the instant when the electromotive forces of the machine and circuit are alike in frequency, phase and value.

My invention will be better understood from the following description taken in connection with the accompanying drawing, and its scope will be pointed out in the appended claims.

Figure 1 illustrates diagrammatically an embodiment of my invention, and Figs. 2 to 11, inclusive, are vector diagrams illustrating the principles upon which my invention is based.

For purposes of illustration, I have shown in Fig. 1 an embodiment of my invention as applied to a three phase alternating current electric system comprising an alternating current electric circuit such as a bus 1 to which may be connected one or more dynamo electric machines 2 or sources of alternating current in parallel as is well known to the art. I have illustrated the dynamo electric machine 2 as an alternator adapted to be connected to the bus 1 by any suitable circuit controlling means 3 arranged to control a circuit 4 between the bus 1 and the alternator 2. The circuit controlling means 3 preferably comprises an electroresponsive closing means such as a closing coil 5 connected in a control circuit 6 which may be connected across a control bus 7, and which may include an auxiliary switch 8 arranged to be controlled by the circuit controlling means 3 so as to be closed when the circuit controlling means is open and open when the circuit controlling means is closed.

For controlling the control circuit 6, I provide electroresponsive means comprising a pluarlity of circuit controlling members 9, 10 and 11 which are arranged to control contacts 12, 13 and 14 or 15, respectively, arranged in series in the control circuit 6. The electroresponsive means may comprise a plurality of differentially acting electroresponsive devices or relays 16, 17 and 18 which may be of the shaded pole induction disk motor type, each element comprising an induction disk and a plurality of motor elements arranged to exert opposing torques thereon.

For energizing the motor elements of the relays I provide, in accordance with my invention, a plurality of sources of electromotive force such as potential transformers 19, 20 and 21, 22 connected in circuit with the bus 1 and the alternator 2, respectively, on opposite sides of the circuit controlling means 3. The secondaries of the transformers 19 and 21 are connected in circuit for opposing electromotive forces when their electromotive forces are in phase and the secondaries of the transformers 20 and 22 are connected in circuit for cumulative electromotive forces when their electromotive forces are in phase.

The relay 16 which controls circuit controlling member 9 may comprise an induction disk 23, shaded pole motor elements 24 and 25 arranged to exert opposing torques thereon, and suitable means such as a drag magnet 26 for exerting a retarding force on the disk 23 so as to obtain a time delay action in the movement thereof. Movement of the disk 23 in a direction to carry circuit controlling member 9 away from circuit closing position is limited by any suitable means such as a stop 26′. The position of the stop 26′ relatively to the contacts 12 may be determined in accordance with the angular movement of the disk 23 necessary to provide the time delay desired and in a practical embodiment of my invention I have arranged the stop 26′ and the contacts 12 so that the disk 23 may have an angular movement of approximately 180°. Motor element 24 is provided with an energizing winding 27 connected in series relation with the secondaries of the potential transformers 19 and 21 and motor element 25 is provided with an energizing winding 28 connected in series relation with the secondaries of the potential transformers 20 and 22. The motor elements 24 and 25 tend to exert opposing torques on the disk 23 irrespective of the directions of current flow in their windings 27 and 28, respectively.

The relay 17 which controls circuit controlling member 10 may comprise an induction disk 29 and shaded pole motor elements 30 and 31 arranged to exert opposing torques thereon. Motor element 30 is provided with an energizing winding 32 connected in series relation with the secondaries of the transformers 19 and 21, and motor element 31 is provided with an energizing winding 33 connected in series relation with the secondaries of the transformers 20 and 22. The motor elements 30 and 31 tend to exert exposing torques on the disk 29 irrespective of the directions of current flow in their windings 32 and 33 respectively. The disk 29 is so shaped and the shaded poles of the motor elements 30 and 31 so arranged with respect to the disk 29 that in the event of either of the motor elements 30, 31 predominating to turn the disk 29, the torque exerted by the stronger element is increased while the torque exerted by the weaker element is decreased. One way to obtain this effect is to remove a segment of the disk 29 and arrange the shaded poles as shown so that an increasing area of the disk is presented adjacent the shaded pole faces of the motor element tending to exert the greater torque and a decreasing area of the disk adjacent the shaded pole faces of the motor element tending to exert the smaller torque. This construction and arrangement of parts also provides for a quick positive movement of the disk 29 substantially of the nature of a snap action which is desirable. Movement of the disk 29 in a direction to carry circuit controlling member 10 away from circuit closing position is limited by any suitable means such as a stop 34.

The relay 18 which controls circuit controlling member 11 may comprise an induction disk 35 and shaded pole motor elements 36 and 37 arranged to exert opposing torques thereon. The motor element 36 is provided with an energizing winding 38 connected across the terminals of the secondary of transformer 21 and the motor element 37 is provided with an energizing winding 39 connected across the terminals of the secondary of the transformer 19. The motor elements 36 and 37 tend to exert opposing torques on the disk 35 irrespective of the directions of current flow in their windings 38 and 39 respectively. Obviously when the motor elements 36 and 37 exert equal torques, that is to say, when the voltage of the alternator 2 is substantially equal to the voltage on the bus 1, the disk 35 will tend to remain stationary and the contacts 14 and 15 closed, but upon the occurrence of a predetermined difference in these voltages, the disk 35 will be turned in one direction or the other to open either contacts 14 or 15. One of the contacts of each of the pairs of contacts 14 and 15 may be provided with a depending or tail portion 40 extending into the path of movement of the circuit controlling member 11 and each of these contact members may also be resiliently mounted for the purpose of maintaining itself in engagement with its cooperating contact. The contacts with the depending portions 40 also act to limit the movement of the disk 35 in either direction and tend to return the disk 35 to an intermediate position when the torques exerted by the motor elements 36 and 37 are substantially equal.

For the operation of my synchronizing device, it will be desirable to refer to Figs. 2 to 11, inclusive, which are vector diagrams illustrating the principles upon which my invention is based. In these diagrams, the heavy solid lines designated E and shown in a fixed position as a reference line, represent the voltage on the bus 1 or a voltage proportional thereto as, for example, the voltage across the secondary of each of the transformers 19 and 20. The heavy solid lines designated $e$ represent the voltage of the alternator 2 or a voltage proportional thereto as, for example, the voltage across the secondary of each of the transformers 21 and 22. The vector $e$ is assumed to rotate in accordance with the phase relation of the two electromotive forces to be synchronized. The heavy dashed lines designated $e_r$ represent the voltage $e$ reversed. The vectors E, $e$ and $e_r$ are assumed equal in length as this is a condition for controlling the control circuit 6 under the control of relay element 18 or other equivalent means. The light solid lines designated $x$ and $y$ represent the vectorial differences of E and $e$, and E and $e_r$ respectively, that is to say, $x$ represents the vectorial difference and $y$ the vectorial sum of E and $e$. The voltages $x$ and $y$, in accordance with their relative values control the operation of the relay elements 16 and 17. For convenience, the vector diagrams are assumed to be divided into four quadrants $a$, $b$, $c$, and $d$ respectively as indicated in Fig. 10.

Figure 5:
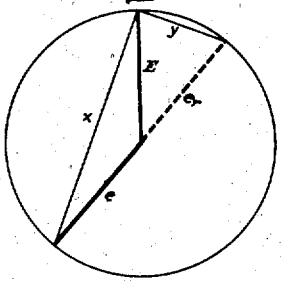

Fig. 5 represents the voltage of the alternator 2 more than 90 degrees and less than 180 degrees out of phase with the voltage on the bus 1, that is to say, voltage $e$ in quadrant $b$. In this case voltage $y$ is less than voltage $x$.

Figure 6:
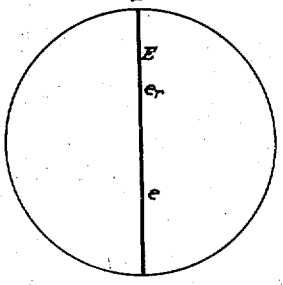

Fig. 6 represents the voltage of the alternator 2, 180 degrees out of phase with the voltage on the bus 1. In this case $x$ has attained its maximum value and $y$ is zero.

Figure 7:
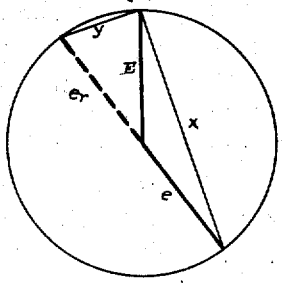

Fig. 7 represents the voltage of the alternator 2 more than 180 degrees and less than 270 degrees out of phase with the voltage on the bus 1, that is to say, voltage $e$ in quadrant $c$. In this case voltage $x$ is greater than voltage $y$.

Figure 8:
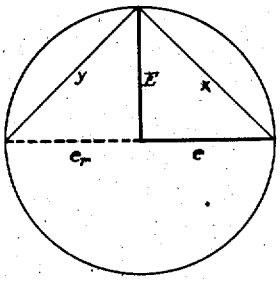

Fig. 8 represents the voltage of the alternator 2, 270 degrees out of phase with the voltage on the bus 1. In this case, voltage $x$ equals voltage $y$.

Figure 9:
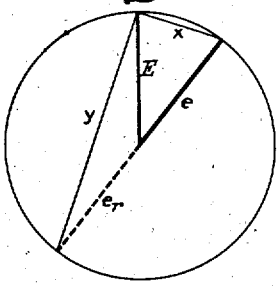

Fig. 9 represents the voltage of the alternator 2, more than 270 degrees and less than 360 degrees out of phase with the voltage on the bus 1, that is to say, voltage $e$ in quadrant $d$ approaching phase coincidence with voltage E. In this case voltage $y$ is greater than voltage $x$.

Figure 10:
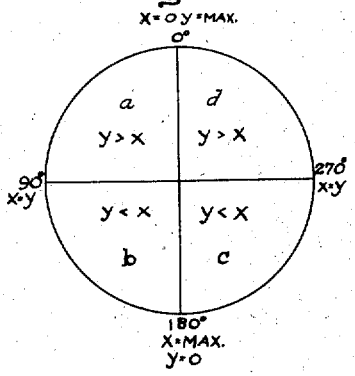

Fig. 10 is a summary indicating the relative values of the voltages $x$ and $y$ in the different quadrants and under the different conditions heretofore considered.

From these figures, particularly Fig. 10, and assuming disk 23 not retarded in its movement and disk 29 circular and motor elements 24 and 25 and also 30 and 31 to be so alike in features of construction that, when their respective windings 27 and 28 and also 32 and 33 are equally energized, equal torques are produced, it will be observed that through a certain range of phase difference, viz, 90 degrees to 270 degrees or when voltage $y$ is less than voltage $x$, as in quadrants $b$ and $c$, motor elements 24 and 30 would predominate to turn their respective disks counter clockwise, that is, the disk 23 to circuit opening position and the disk 29 to circuit closing position and that through another certain range of phase difference, viz, 270 degrees to 90 degrees or when voltage $y$ is greater than voltage $x$, as in quadrants $d$ and $a$, motor elements 25 and 31 would predominate to turn their disks 23 and 29 clockwise, that is, disk 23 to circuit closing position and disk 29 to circuit opening position. Under these conditions the disks 23 and 29 would not simultaneously be in circuit closing position.

In order that the circuit controlling means 3 may be closed only when the electromotive forces of the bus 1 and alternator 2 are substantially alike in phase, frequency and value, I so construct and arrange the relays 16, 17 and 18 that the movable elements thereof must simultaneously be in predetermined positions. For this purpose, I may construct the respective motor elements of relays 16 and 17 of different strengths and provide means for retarding the movement of the disk 23 and also arrange the disks 29 to provide differential effects. The motor elements 36 and 37 of relay 18 may be substantially similar in construction so as to permit the contacts 14 and 15 to remain closed when the difference in voltages of the alternator 2 and bus 1 is within a predetermined amount which in a practical embodiment of my invention, I have taken so that the voltages must be within five per cent of each other.

Figure 1:
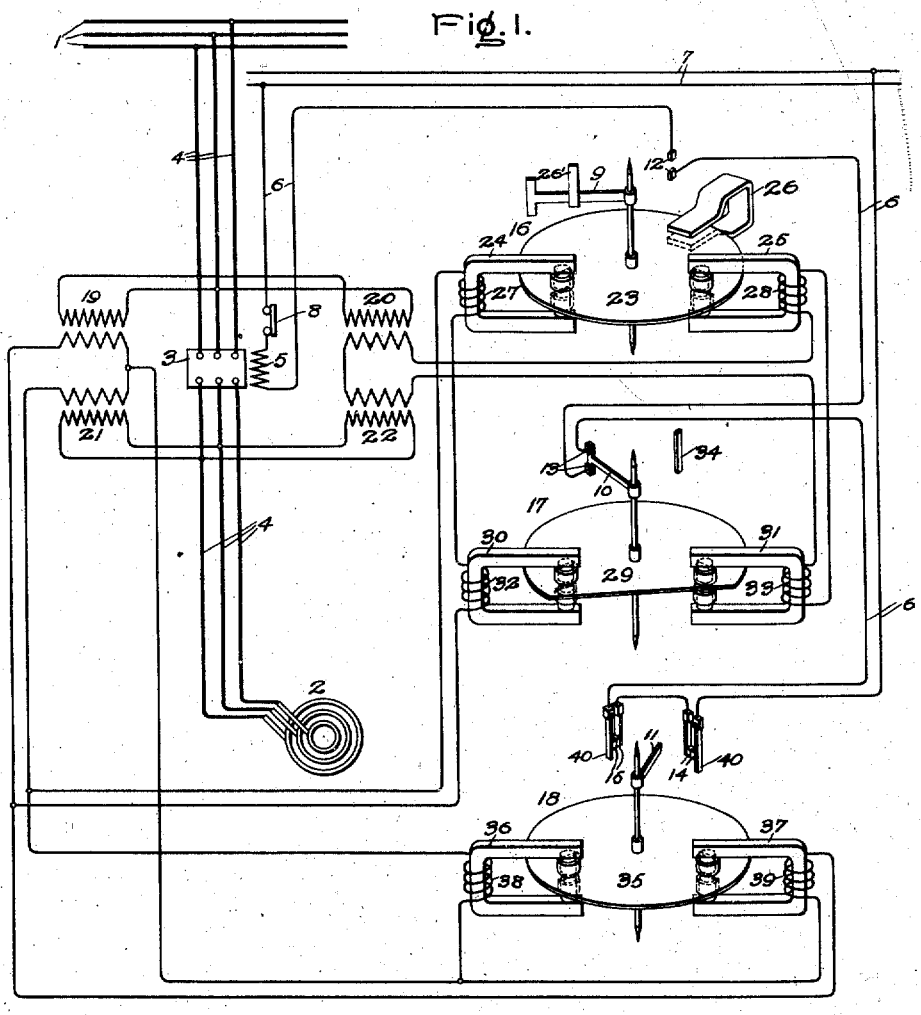
Figure 2:
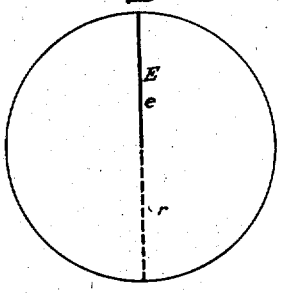
Fig. 2 represents the in-phase condition of the voltages on the bus 1 and the alternator 2. In this case, the vectors E and $e$ coincide, $x$ is zero and $y$ has its maximum value.
Figure 3:
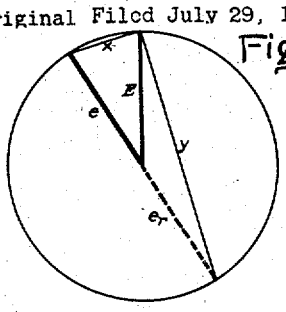
Fig. 3 represents the voltage of the alternator less than 90 degrees out of phase with the voltage on the bus 1, that is to say voltage is quadrant $a$. In this case, voltage $y$ is greater than voltage $x$.
Figure 11:
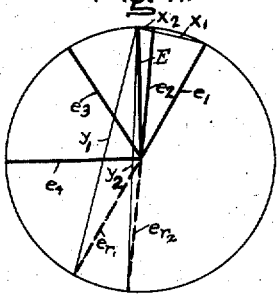

Referring now to Figures 1 and 11, motor element 25 may be so constructed as to predominate over motor element 24 to start disk 23 moving to circuit closing position when voltage $e$ has reached a position $e_1$ prior to phase coincidence where voltage $y$ has a value $y_1$ and voltage $x$ the corresponding value $x_1$ and contacts 12 will be closed with a time delay, and when voltage $e$ passes through phase coincidence to a position $e_3$ where $x$ and $y$ again have substantially the same values $x_1$ and $y_1$, motor element 24 will predominate and move disk 23 to circuit opening position. In a practical embodiment of my invention voltages $x_1$ and $y_1$ have substantially the values 40 and 220 volts respectively. Thus, as voltage $e$ moves to and away from phase coincidence through the range of phase difference from $e_1$ to $e_3$, disk 23 will be moved toward circuit closing position with a time delay, while in the range of phase difference from $e_3$ through phase opposition to $e_1$, disk 23 will be moved toward circuit opening position. For the values of the voltages $x$ and $y$ and the action herein set forth, it will be obvious that motor element 24 should be constructed to exert the predominant torque when voltage $x$ is greater than 40 volts and voltage $y$ less than 220 volts. In which case motor element 25 will exert the predominant torque when voltage $x$ is less than 40 volts and voltage $y$ greater than 220 volts.

Figure 4:
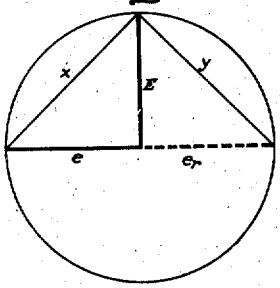
Fig. 4 represents the voltage of the alternator 2, 90 degrees out of phase with the voltage on the bus 1. In this case, voltage $x$ equals voltage $y$.

The position $e_1$ of the voltage $e$, Fig. 11 corresponds to the parts in position as shown in Fig. 1. In this position, more of the disk 29 is adjacent the pole faces of motor element 30 than is adjacent the pole faces of motor element 31. Motor element 30 then predominates to hold disk 29 in circuit closing position. As voltage $e$ moves to substantially phase coincidence, that is, position $e_2$, voltage $x$ decreases to $x_2$ and voltage $y$ increases to $y_2$ and motor element 31 then predominates to move disk 29 quickly to circuit opening position. According to my invention, the particular position of $e_2$ is preferably, for practical purposes, just before phase coincidence as this allows somewhat for the time necessary to close the circuit controlling means 3. In a practical embodiment of my invention, motor element 31 is constructed to predominate when voltages $x$ and $y$ reach substantially the values 20 and 220 volts respectively. When motor element 31 predominates to move the disk 29 clockwise, an increasing area of the disk 29 will be presented adjacent its pole faces and a decreasing area adjacent the pole faces of motor element 30. Consequently, motor element 31 will be rendered more effective in its predominance and the effect of motor element 30 decreased. The disk 29 will therefore be quickly moved to circuit opening position and more of the disk 29 will be adjacent the pole faces of motor element 31 and less adjacent the pole faces of motor element 30. Consequently voltage $x$ will have to increase appreciably and voltage $y$ decrease accordingly in order that motor element 30 may predominate to move the disk 29 to circuit closing position. In order to insure that the disk 29 may not move to circuit closing position until after the disk 23 has moved to circuit opening position, I construct the motor elements 30 and 31 so that with the disk 29 in circuit opening position, the voltage $e$ must reach a position $e_4$ such as, for example, substantially quadrature or 90 degrees from phase coincidence where voltages $x$ and $y$ are substantially equal, (see Fig. 4) before motor element 30 can predominate to move the disk 29 to circuit closing position. The particular position of $e_4$ is immaterial, the main requisite being that the position of $e$ where motor element 30 predominates to move disk 29 to circuit closing position should be in phase displacement subsequent to the position $e_3$ where motor element 24 predominates to move the disk 23 to circuit opening position. In a practical embodiment of my invention, the values of the voltages $x$ and $y$, corresponding to the position $e_4$ of the voltage $e$, are each substantially 150 volts. When motor element 30 predominates to move the disk 29 to circuit closing position, the disk (see Fig. 1) will remain substantially in this position until voltage $e$ reaches the position $e_2$, when motor element 31 will again predominate and move the disk 29 to circuit opening position as heretofore set forth. Thus, as voltage $e$ moves to and away from phase coincidence through the range of phase difference from $e_2$ to $e_4$, the disk 29 will be in circuit opening position while in the range of phase difference from $e_4$ through phase opposition to $e_2$, the disk 29 will be in circuit closing position.

It will therefore be obvious that the difference between the frequencies of the alternator and bus voltages must be less than a predetermined amount in order that the disk 23 may have time to move to circuit closing position before disk 29 is moved to circuit opening position. Moreover, the range of phase difference over which both the disks 23 and 29 may simultaneously be in circuit closing position is limited and consequently the control circuit 6 can be completed only during a limited number of degrees before synchronism and not after. This allows somewhat for the time required to close the circuit controlling means 3. It is, of course, assumed that the voltages of the alternator 2 and bus 1 are equal so that contacts 14 and 15 remain closed. If these voltages are not equal one or the other of the contacts 14 and 15 will be opened in consequence of the differential action of the motor elements 36, 37 on the disk 35 and therefore the control circuit 6 will be held open even though the alternator voltage has the same frequency as, and is in phase with, the bus voltage. It is therefore clear that the control circuit 6 controlling the operation of closing the circuit controlling means 3 can be closed only when the voltages of the alternator 2 and the bus 1 are substantially alike in phase, frequency, and value. It is moreover clear from Fig. 11 and the explanation therewith that contacts 13 which open just before synchronism remain open until 90 degrees or more after synchronism since motor element 31 of relay 17 tends to predominate until the voltage $e$ is substantially 90 degrees beyond phase coincidence.

Although I have shown and described my invention in considerable detail, I do not wish to be limited to the specific details thereof, as shown and described, but may use such modifications, substitutions or equivalents thereof, as are embraced within the spirit of my invention.

What I claim as new and desire to secure by Letters Patents of the United States is:

1. In a system of the class described wherein two sources of alternating electromotive force are to be synchronized, a switch for connecting the sources, and means for controlling the closing of said switch, comprising a plurality of relays connected and arranged so that the movable elements of the respective relays must simultaneously be in predetermined positions to enable said switch to be closed, one of said relays being connected to said sources of electromotive force and arranged to tend to move to switch closing position during a predetermined range of phase difference between the electromotive forces near phase co-incidence and tending to move away from switch closing position when the phase difference is outside of this range, means for delaying the operation of said relay whereby it can reach switch closing position during the predetermined range of phase difference only when the frequencies of said electromotive forces are substantially the same, another of said relays being connected to said sources of electromotive force and arranged to remain in switch closing position during a range of phase difference beginning subsequently to the ending of said first range of phase difference and ending substantially at phase co-incidence, and to then move quickly out of switch closing position, and means connected to said sources of electromotive force and arranged to permit the closing of said switch only when the electromotive forces have substantially the same value.

2. In an alternating current electric system wherein two sources of alternating electromotive force are to be synchronized, means adapted to be operated to connect said sources, and means for effecting the operation of said connecting means when the electromotive forces of said sources are in synchronism, comprising a control circuit, a plurality of contacts arranged in series in said control circuit and a plurality of relays for controlling said contacts having energizing windings connected in circuit with said sources to render said relays responsive to the phase relation of said electromotive forces, one of said relays being operative in response to a predetermined phase difference between said electromotive forces to close the contacts controlled thereby and upon the occurrence of a smaller predetermined phase difference to open said contacts and another of said relays being operative in response to a predetermined phase difference between said electromotive forces with a time delay such that the contacts controlled thereby are moved to circuit closing position while said first contacts are in circuit closing position only when the difference between the frequencies of said electromotive forces is below a predetermined value.

3. In a system of the class described wherein two sources of alternating electromotive force are to be synchronized, a switch for connecting the sources together, and means for controlling the closing of said switch, comprising a plurality of relays connected and arranged so that the movable elements of the respective relays must simultaneously be in predetermined positions to enable said switch to be closed, two of said relays each having windings connected to be individually responsive to a resultant of the instantaneous values of the electromotive forces to be synchronized, one of the windings on each relay being arranged to tend to move the element of the relay oppositely to the tendency of another winding to move the element so that movement of the element of each of said relays depends upon the differential effects of the winding thereon, the windings on each relay being connected so that when the electromotive forces are in phase one winding approaches its maximum effect and the other winding its minimum effect, one of said relays being arranged to tend to close while said electromotive forces are within a predetermined range of phase difference, means for retarding the operation of said relay so that the element thereof can reach circuit closing position only when the frequencies of the electromotive forces are substantially the same, the other relay being constructed to remain closed during a predetermined range of phase difference while said electromotive forces are approaching phase coincidence and to move quickly away from switch closing position when the electromotive forces are substantially in phase whereby the switch can be closed only when the frequencies of the electromotive forces are so nearly the same as to permit synchronizing and only during an interval while the electromotive forces are approaching phase coincidence and their phase difference is within a predetermined range.

4. In an alternating current electric system wherein the electromotive force of an alternating current dynamo electric machine is to be synchronized with the electromotive force of an alternating current electric circuit, synchronizing means comprising a plurality of cooperating electroresponsive devices, one of said devices comprising a movable member, contacts controlled by the movement thereof, and a plurality of motor elements arranged to exert opposing torques on said member, one of said elements being connected in circuit to be energized in accordance with the vectorial sum of and another in accordance with the vectorial difference between said electromotive forces, the construction and arrangement of parts being such that said elements operate to move said member to contact closing position upon the occurrence of a predetermined phase difference between said electromotive forces and to move said member from contact closing position upon the occurrence of a smaller predetermined phase difference, and another of said devices comprising a movable member, contacts controlled by the movement thereof, means for retarding the movement of said member, and a plurality of motor elements arranged to exert opposing torques on said member, one of said elements being connected in circuit to be energized in accordance with the vectorial sum of and another in accordance with the vectorial difference between said electromotive forces whereby movement of said member to contact closing position is effected in accordance with the phase difference between said electromotive forces, the construction and arrangement of parts being such that when the difference between the frequencies of said electromotive forces exceeds a predetermined amount said member will tend to reach contact closing position subsequently to the movement of said first member from contact closing position.

5. In an alternating current electric system wherein two sources of alternating electromotive force are to be synchronized, means for connecting the sources, and means for controlling the closing of said connecting means comprising a plurality of cooperating electroresponsive devices, each of said devices comprising a movable member and having energizing windings arranged to exert opposing effects thereon, the energizing windings of each of two of said devices being connected in circuit with said sources to be energized respectively in accordance with the sum of and difference between the instantaneous values of the electromotive forces to render the devices operative in response to the phase relation thereof, the movable member of one of said two devices being operative in response to a predetermined phase difference between said electromotive forces to move to circuit closing position and to move to circuit opening position in response to a smaller predetermined phase difference and the other of said two devices comprising means for retarding the movement of the movable member thereof whereby the member is operative in response to a predetermined phase difference between the electromotive forces to move to circuit closing position with a time delay such that when the difference between the frequencies of said electromotive forces exceeds a predetermined amount circuit closing position is reached subsequently to the movement of said first member to circuit opening position, and another of said plurality of devices having the energizing windings thereof connected in circuit with said sources to be energized in accordance with the respective values of the electromotive forces thereof whereby the movable member is moved to circuit opening position upon the occurrence of a predetermined difference between the electromotive forces, the construction and arrangement of parts being such that the movable elements of said plurality of electroresponsive devices must simultaneously be in predetermined positions to enable said connecting means to be closed.

6. In an alternating current electric system wherein two sources of alternating electromotive force are to be synchronized, synchronizing means comprising a control circuit and a plurality of cooperating electroresponsive devices for controlling said circuit, one of said devices comprising a rotatable contact controlling member and a plurality of motor elements arranged to exert opposing torques thereon connected in circuit with said sources to be energized in accordance with the vectorial sum of and difference between the electromotive forces thereof respectively, the construction and arrangement of parts being such that upon the occurrence of a predetermined phase difference between the electromotive forces said member is quickly moved to circuit closing position and upon the occurrence of a smaller predetermined phase difference is quickly moved to circuit opening position, another of said devices comprising a rotatable contact controlling member, means for retarding the movement thereof and a plurality of motor elements arranged to exert opposing torques thereon connected in circuit with said sources to be energized in accordance with the vectorial sum of and difference between the electromotive forces thereof respectively, the construction and arrangement of parts being such that upon the occurrence of predetermined phase difference between the electromotive forces said member is moved to circuit closing position with a time delay such that when the difference between the frequencies of said electromotive forces exceeds a predetermined amount said member will tend to reach circuit closing position subsequently to the movement of said first member to circuit opening position.

7. In an alternating current electric system wherein two sources of alternating electromotive force are to be synchronized, means adapted to be operated to connect said sources, and means for effecting the operation of said connecting means when the electromotive forces of said sources are substantially equal and in synchronism, comprising a control circuit, a plurality of relatively movable cooperating contacts arranged in series in said control circuit and a plurality of relays for controlling said contacts, two of said relays having energizing windings connected in circuit with said sources to render said relays responsive to the phase relation of the electromotive forces thereof, one of said two relays being operative in response to a predetermined phase difference between the electromotive forces to close the contacts controlled thereby and hold them closed until the occurrence of a smaller predetermined phase difference between said electromotive forces, and another of said two relays being operative in response to a predetermined phase difference between said electromotive forces with a time delay such that the contacts controlled thereby are moved to circuit closing position while said first contacts are in circuit closing position only when the difference between the frequencies of said electromotive forces is below a predetermined value and another of said plurality of relays having energizing windings connected in circuit with said alternator and said circuit respectively to render said relay operative in response to the difference between said electromotive forces whereby the contacts controlled thereby are moved to circuit opening position upon the occurrence of a predetermined difference between said electromotive forces.

8. In an alternating current electric system wherein two sources of alternating electromotive force are to be synchronized, means for connecting said sources, means comprising a control circuit for effecting the operation of said connecting means, and means for controlling said control circuit comprising a plurality of electroresponsive devices each including a rotatable member, contacts controlled thereby and arranged in series in said control circuit and a plurality of motor elements constructed and arranged to exert opposing torques on said rotatable member irrespective of the directions of the currents in the energizing windings thereof, and each of said devices having the energizing winding of one of the motor elements connected in circuit to be energized in accordance with the sum of the electromotive forces of said machine and said circuit and the energizing winding of another of said elements connected in circuit to be energized in accordance with the difference between said electromotive forces whereby said devices are responsive to the phase difference and difference between the frequencies of said electromotive forces, the rotatable member of one of said devices being adapted upon movement thereof in response to the occurrence of a difference between the torques exerted thereon by said motor elements to increase the effect of the element exerting the greater torque and decrease the effect of the element exerting the smaller torque whereby the predominant motor element is rendered more effective, the construction and arrangement of parts being such that said motor elements operate to move said member to contact controlling position upon the occurrence of a predetermined phase difference and to hold said member in contact closing position until the occurrence of a smaller predetermined phase difference, and another of said devices comprising means for retarding the movement of the rotatable member thereof, the construction and arrangement of parts being such that when the difference between the frequencies of said electromotive forces is below a predetermined value said rotatable member is caused to move to contact closing position while the contacts of said first device are closed whereby said control circuit is completed to effect the closing of said connecting means.

9. In combination, two alternating current circuits, switching means for connecting the circuits, and means controlled in accordance with the phase relation and the difference between the frequencies of the electromotive forces of the circuits for starting the closing operation of the switching means only when the phase difference of the electromotive forces exceeds a predetermined value and the difference between the frequencies of the electromotive forces is less than a predetermined value.

10. In combination, two alternating current circuits, switching means for connecting the circuits and means connected to be energized in accordance with the difference between the effects of the sum of and the difference between the electromotive forces of the circuits for starting the closing operation of the switching means only when the phase difference of the electromotive forces exceeds a predetermined value and the difference between the frequencies of the electromotive forces is less than a predetermined value.

11. In combination, two alternating current circuits, means for controlling the interconnection of said circuits comprising a control circuit, a relay responsive to conditions in said circuits operable to make a connection in the control circuit only during a predetermined range of phase difference between the electromotive forces of the circuits when the difference between the frequencies is less than a predetermined value, and a relay responsive to conditions in said circuits operable within said range to control another connection in the control circuit.

12. In combination, two alternating current circuits, means for controlling the interconnection of said circuits comprising a control circuit, a relay connected and arranged to be energized in accordance with the sum of and the difference between the electromotive forces of the circuits operable to make a connection in the control circuit only during a predetermined range of phase difference between the electromotive forces when the frequency difference between the electromotive forces is less than a predetermined value, and a relay connected and arranged to be energized in accordance with the sum of and the difference between the electromotive forces operable within said range to control another connection in the control circuit.

13. In combination, two alternating current circuits, a switch for connecting the circuits, and means for controlling the closing of the switch comprising a plurality of relays connected and arranged so that the movable elements thereof must simultaneously be in predetermined positions to start the closing operation of the switch, one of said relays being connected to said circuits and arranged to tend to move to switch closing position during a predetermined range of phase difference between the electromotive forces of the circuits and to move from switch closing position when the phase difference is outside this range, means for delaying the operation of said relay whereby the relay can reach switch closing position only when the difference between the frequencies of the electromotive forces is less than a predetermined value, and another of said relays being connected to said circuits and arranged to remain in switch closing position during a range of phase difference beginning subsequently to the end of said first range of phase difference and ending prior to phase coincidence and then to move quickly out of switch closing position.

14. In combination, two alternating current circuits, a switch for connecting the circuits, and means for controlling the closing of the switch comprising a plurality of relays connected and arranged so that the movable elements thereof must simultaneously be in predetermined positions to start the closing operation of the switch, one of said relays being connected to said circuits and arranged to tend to move the switch closing position during a predetermined range of phase difference between the electromotive forces of the circuits including phase coincidence and to move from switch closing position when the phase difference is outside this range, means for delaying the operation of said relay whereby the relay can reach switch closing position only when the difference between the frequencies of the electromotive forces is less than a predetermined value, and another of said relays being connected to said circuits and arranged to remain in switch closing position during a range of phase difference beginning subsequently to the end of said first range of phase difference and ending prior to phase coincidence and then to move quickly out of switch closing position.

15. A synchronizing device comprising a movable circuit controlling member, means for exerting opposing torques on the member, means for retarding the movement of the member to circuit controlling position, a cooperating movable circuit controlling member, means for exerting opposing torques on said cooperating member quickly to move and hold it in circuit controlling position when one of the torques exceeds the other by a predetermined amount and quickly to move said cooperating member from circuit controlling position when the other torque exceeds the first torque by a predetermined amount.

16. A synchronizing device comprising a plurality of cooperating relays, each having an induction disk adapted to be actuated in accordance with the sum of and difference between two electromotive forces, contacts controlled by said disks and means for retarding the movement of one of said disks.

17. In combination with two alternating current circuits, switching means for connecting said circuits and means for controlling said switching means comprising a control circuit, a plurality of contacts in the control circuit, a relay connected and arranged to be energized in accordance with the phase relation between the electromotive forces of said circuits for maintaining one of said contacts closed during a predetermined range of phase difference between the electromotive forces and a relay connected and arranged to be energized in accordance with the phase relation between said electromotive forces for closing another of said contacts during another predetermined range of phase difference.

18. In combination with two alternating current circuits and means for controlling the inter-connection of said circuits, a control circuit, means connected and arranged to be energized in accordance with the phase relation between the electromotive forces of said alternating current circuits operable to effect a connection in the control circuit only during a limited range of phase difference between electromotive forces when the difference between their frequencies is less than a predetermined value, and means responsive to the phase relation between said electromotive forces operable within said range to control another connection in the control circuit.

19. In combination with two alternating current circuits and a switch for connecting the circuits, means for controlling the operation of said switch comprising a movable member, and means connected and arranged to be energized in accordance with the phase relation between the electromotive forces of said circuits for maintaining said member in switch operating position during a predetermined range of phase difference between said electromotive forces, and means connected and arranged to be energized in accordance with the phase relation between said electromotive forces operative in response to a different predetermined phase relation to limit the operation of said switch to a portion of said first predetermined range.

20. In combination with two alternating current circuits and a switch for connecting the circuits, means for controlling the closing of said switch comprising a movable member, and means connected and arranged to be energized in accordance with the phase relation between the electromotive forces of said circuits for maintaining said member in switch closing position during a predetermined range of phase difference between said electromotive forces, and means for limiting the closing of said switch to a portion of said predetermined range comprising a movable member and actuating means connected and arranged to be energized in accordance with the phase relation between said electromotive forces for moving the member to switch closing position during a different range of phase difference.

In witness whereof, I have hereunto set my hand this 16th day of November, 1927.

OLIVER C. TRAVER.